United States Patent

[11] 3,596,923

[72] Inventors Iwao Nakamura
 Tokyo;
 Koichi Saito, Yokohama, both of, Japan
[21] Appl. No. 800,878
[22] Filed Feb. 20, 1969
[45] Patented Aug. 3, 1971
[73] Assignee Nissan Motor Company, Limited
 Yokohama, Japan
[32] Priority Sept. 26, 1968
[33] Japan
[31] 43/82970

[54] SUPPORT MEANS FOR AUTOMOBILE SUSPENSION
3 Claims, 9 Drawing Figs.
[52] U.S. Cl. ............................................. 280/124, 267/54
[51] Int. Cl. ...................................... B60g 11/42
[50] Field of Search ........................................ 280/124; 267/54 A, 54

[56] References Cited
UNITED STATES PATENTS
| | | | |
|---|---|---|---|
| 2,416,243 | 2/1947 | Thiry | 267/54 A |
| 2,236,686 | 4/1941 | Jackson | 267/54 A |
| 1,624,239 | 4/1927 | Harris | 267/54 A |

Primary Examiner—Philip Goodman
Attorneys—Robert E. Burns and Emmanuel J. Lobato ABSTRACT: A support adapted to absorb shocks and vibrations occurring in three different directions, vertical, lateral and longitudinal for example in an automobile suspension, comprises two spaced-parallel plates connected with one another by three pins extending respectively through three flanged rubber bushings disposed between the plates and held in three collars of lesser length than the bushings. Two of the collars are fixed to a frame to be supported while the third is fixed to a support member, for example a leaf spring.

SUPPORT MEANS FOR AUTOMOBILE SUSPENSION

This invention relates generally to support for supporting a structure and, more particularly, to an improved support of the character which is adapted to absorb shocks and vibrations transferred thereto in the vertical and longitudinal directions and prevent a lateral sway of the structure supported on the support. The support according to this invention is specially useful where it is used for supporting the sprung weight of an automobile in a suspension of the leaf-spring type.

An automobile usually uses a number of bushings for the purpose of insulating shocks and vibrations from the associated structures and as long as this particular purpose should be achieved the bushings must be given proper characteristics of elasticity or "springness." To enhance the running stability, on the other hand, it is critical to provide the bushings with sufficient order of stiffness or hardness. These mutually conflicting requirements have, as is well known, imposed considerable restraints on the design concept of the bushings that are intended specifically for use on the suspension of leaf-spring type. As a matter of fact, a difficulty is usually encountered in the existing suspension of leaf-spring type in that it is not afforded with satisfactory springness in a lateral direction, although it really is in a vertical direction.

When a bump or hole is encountered as the automobile is running on a road, the automobile is subjected to shocks and vibrations in vertical and longitudinal directions, causing the automobile body to shake up and down and fore and aft, respectively. To prevent these shocks and vibrations to enter the passenger compartment, it is necessary to soften or dampen them out before they are transferred from the suspension to the frame structure of the automobile. Thus, the frame structure, or more particularly the sprung weight, of the automobile must be carried by a supporting member having such elasticity as is adequate for absorbing a major portion of such shocks and vibrations.

When, on the other hand, the automobile is in a turn either clockwise or counterclockwise, the automobile body is liable to sway leftwardly or rightwardly, respectively, due to the force of inertia, to the detriment of the running stability. To minimize such a lateral sway of the automobile body, the frame structure must be carried on the suspension with sufficient rigidity in the transverse direction of the automobile.

The invention therefore contemplates providing a support which is sufficiently elastic in the longitudinal and vertical directions and rigid in the lateral direction thereof whereby the up-and-down and fore-and-aft shakes and the right-and-left sway of the automobile can be prevented effectively.

Figure 1:
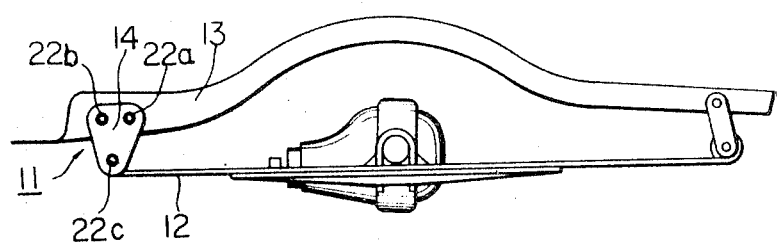
FIG. 1 is an elevation of an automobile suspension carried by the frame of the body through the support according to the invention.
Figure 2:
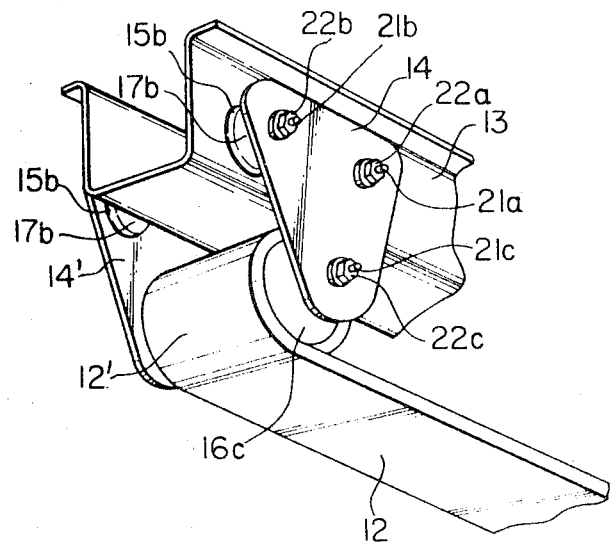
FIG. 2 is a perspective view, on an enlarged scale, of the support shown in FIG. 1.
Figure 3:
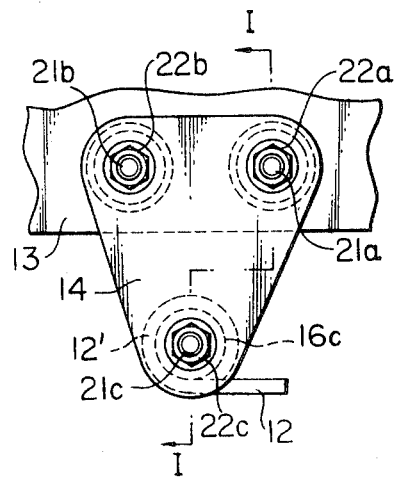
FIG. 3 is an elevation of an embodiment of the support according to the invention.
Figure 4:
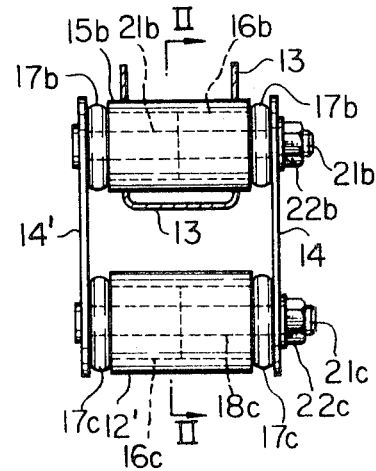
FIG. 4 is the front view of the support shown in FIG. 3.
Figure 5:
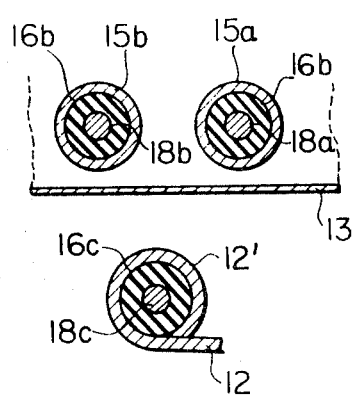
FIG. 5 is the section on line II–II of FIG. 4.
Figure 6:
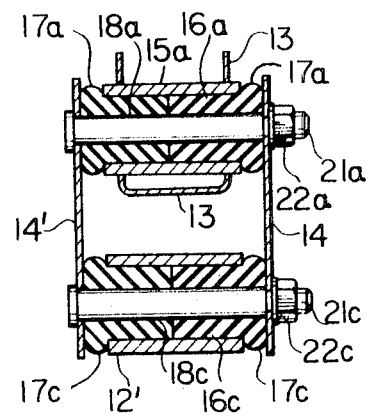
FIG. 6 is the section on line I–I of FIG. 3.
Figure 7:
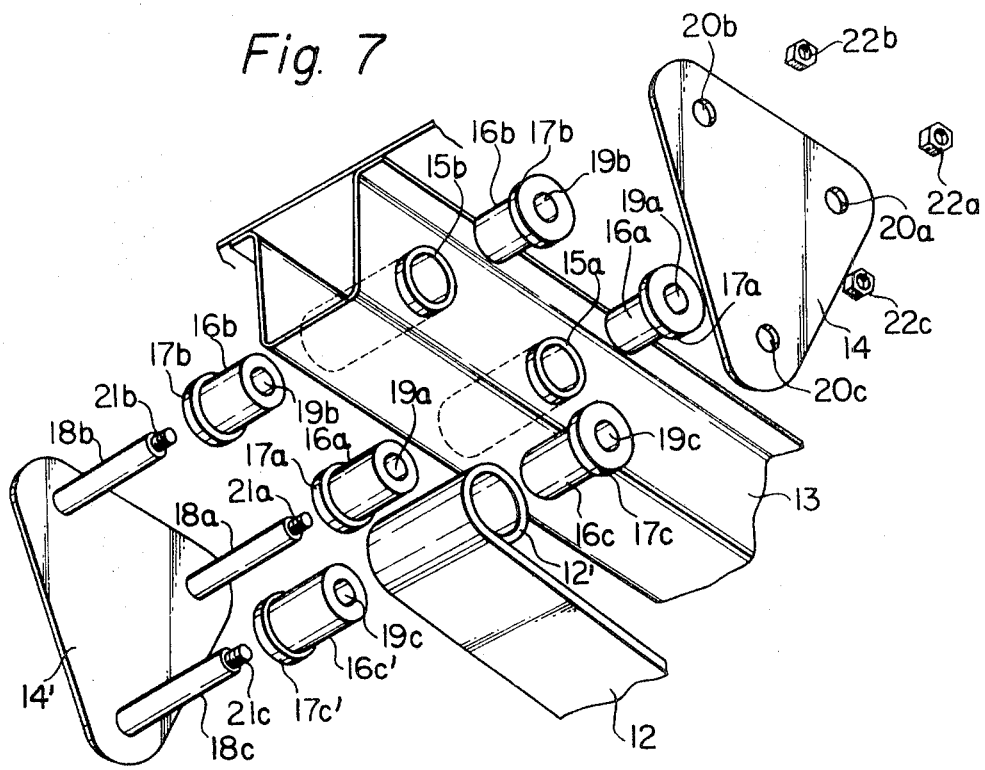
FIG. 7 is an exploded view of the support shown in FIG. 2.

Referring to the drawings, the support which is generally represented by the numeral 11 is illustrated to support one end of a suspension or leaf spring 12 from the frame structure 13 of the automobile body. The opposite end of the spring 12 is connected to the frame structure 13 by a pivoted link 10. It is to be noted that although the present invention is thus shown and described as being used specifically on an automotive suspension of multileaf-spring type, the same may lend itself to any other purposes of damping out the shocks and vibrations that are acting three dimensionally.

According to the present invention, as seen from the drawings, the support 11 is connected at one point with the leaf spring 12 of the suspension and at two points with the frame structure 13 of the automobile body. The leaf spring 12 and frame structure 13 are connected together by a pair of generally triangular plates 14 and 14' which are spaced in parallel with each other at a distance substantially larger than the thickness of the frame structure 13.

The support 11, or more specifically each of the plates 14 and 14', is connected with the frame structure 13 by means of each pair of retainer collars 15a and 15b tightly fitted into the frame structure 13 at a suitable distance from each other, spool-shaped binary (or two-piece) rubber bushings 16a and 16b having flanges 17a and 17b at both ends thereof and inserted tightly into said retainer collars 15a and 15b, respectively, with their flanges 17a and 17b protruded out of the collars, and pins 18a and 18b inserted securely into the open holes 19a and 19b provided axially and centrally in the bushings 16a and 16b, respectively, and secured to the plates 14 and 14'. The pins 18a and 18b are illustrated to be fixedly connected at one end with the plate 14' and secured at the other with the plate 14 through the respective receiving holes 20a and 20b provided therein. The tips 21a and 21b of the pins 18a and 18b are fastened to the plate 14 by means of nuts 22a and 22b, respectively.

The leaf spring 12 of the suspension is rounded at one end so as to form a so-called "spring eye" 12' for tight connection with the plates 14 and 14'. Each of the plates 14 and 14' is connected at its bottom portion with the spring eye or rounded portion 12' by means of a rubber bushing 16c which is shaped similarly to the bushings 16a and 16b and which is inserted tightly into the rounded portion 12' of the leaf spring 12 with its flange 17c protruded out of the portion 12', and a pin 18c inserted into the open hole 19c of the bushing 16c and secured fast to the plates 14 and 14' through the hole 20c thereof by means of a nut 22c which is engaged with the tip 21c of the pin 18c.

The support 11 thus constructed and arranged functions in such a manner that will be discussed in the following.

Figure 8:
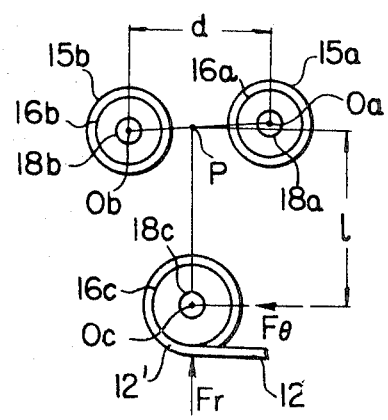
FIG. 8 is the view illustrating the physical function of the support according to the invention.

Assume, as shown in FIG. 8, that the rubber bushings 16a, 16b and 16c are given the spring constants of Ka, Kb and Kc, respectively, each in the direction perpendicular to the axis of the bushing and that the line segment connecting the centers Oa and Oc of the bushings 16a and 16b, respectively, is internally divided in the ratio of Kb vs. Ka at the point P, then we obtain $$\frac{Oa \cdot P}{Ob \cdot P} = \frac{Kb}{Ka}$$

If, therefore, an external force $F\theta$ acting in the direction rectangular to the direction of $P \cdot Oc$ is applied to the rounded portion 12' of the leaf spring 12' of the leaf spring 12, then the point Oc will turn about the point P at the angle of $$\theta = \frac{F\theta \cdot l(Ka+Kb)}{Ka \cdot Kb \cdot d^2}$$

where $l$ represents the length $P\text{-}Oc$ and $d$ represents the length of the projection of the line segment $Oa \cdot Ob$ in the direction parallel to the direction of the force $F\theta$. This causes the point Oc to be displaced by $$\frac{Ka+Kb}{Kc \cdot Kb}\left(\frac{l}{d}\right)^2 \cdot F\theta$$

in the direction of $F\theta$. It therefore follows that the total displacement of the point Oc with respect to the collars 15a and 15b is expressed as $$\left\{\frac{Ka+Kb}{Ka \cdot Kb}\left(\frac{l}{d}\right)^2 + \frac{1}{Ka+Kb} + \frac{1}{Kc}\right\} F\theta,$$

wherein $F\Theta/Ka+Kb$ is the displacement of the point $P$ in the direction of $F\Theta$ and $F\Theta/Ka$ is the displacement of the bushing $16c$ in the direction of $F\Theta$.

The displacement of the portion $12'$ in the direction of $Fr$ due to the force $Fr$ exercised in the direction of $P \cdot Oc$, on the other hand, is $$Fr\left\{\frac{1}{Ka+Kb}+\frac{1}{Kc}\right\}$$

which is the sum of the displacement $Fr/Ka+Kb$ of the point $P$ and the displacement $Fr/Kc$ of the bushing $16c$.

Thus, the displacement of the point $Oc$ in the direction of $F\Theta$, viz, in the longitudinal direction of the suspension is the function of $l/d$, while the displacement in the direction of $Fr$, viz, in the vertical direction varies without regard of $l/d$. This will mean that the displacement of the portion $12'$ in the direction of $Oa \cdot Ob$ can be varied independently of the displacement in the direction of $P \cdot Oc$ merely by changing the value $L/d$ without changing the spring constant of the bushings.

Since, moreover, the vertical weight of the suspension is borne at two different points in the support according to the present invention, while the same is carried at only one point in the conventional counterparts, the less load is imparted to each of the pins $18a$ and $18b$. This is particularly advantageous where a vertical weight is continuously exercised on the support as in the suspension of an automotive vehicle. By rendering the spring constants of the bushings $16a$ and $16b$ substantially equal with each other, viz, $Ka \approx Kb$, substantially the same amount of load may be allotted to each of the pins $18a$ and $18b$, giving rise to the performance quality and durability of the support in its entirety. In this instance, if the bushings are constructed all similarly, then increased simplicity and production economy will result.

Now, another important factor in bushings in general is the stiffness of the bushing in the axial direction thereof, viz, in the direction lateral to the suspension, because it plays a vital role in assuring the running stability of the automobile.

In the support according to the present invention, in which the lateral load applied to the support is borne by two pins each carried by a spool-shaped rubber bushing which is divided into two halves, a far greater stiffness of the support in the lateral direction is attained at will than in the conventional supports which carry the lateral load at and by a single point.

Figure 9:
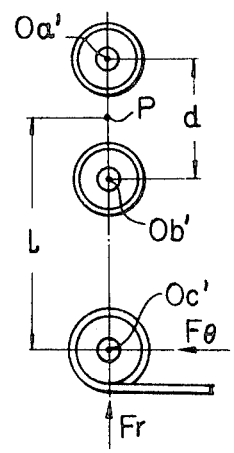
FIG. 9 is the view illustrating the physical function of a modification of the support shown in the preceding Figures.

The three pins $18a$, $18b$ and $18c$ may be, if desired, disposed otherwise, for example, in line with each other as illustrated in FIG. 9. In this instance, too, the spring constants of the bushings in the direction $F\Theta$ can be varied independently of those in the direction of $Fr$ by changing the spring constant $l/d$ since the spring constants of the bushings in the directions of $F\Theta$ and $Fr$ are different from each other. Thus, it is invariably possible in this modified form of the embodiment to have the support stiffened in the vertical direction and softened in the longitudinal direction. The performance quality and durability of the support are also improved in this example because the weight $Fr$ in the direction of $P \cdot Oc'$ is borne by the two pins.

It will now be apparent from the foregoing description that the support according to the present invention provides increased antivibration effect which will lead to improved riding qualities and running stability of the automobile due to the dual functions of the three bushings which absorb the shocks and vibrations not only in the vertical and longitudinal directions but in the lateral direction of the automobile.

It must be understood that although the support according to the invention has been described and shown to be used on the suspension of an automobile, the same may be used and modified in many other ways without departing from the spirit and scope of the present invention which is defined in the appended claims.

We claim:

1. A means for supporting a frame structure on a carrier member having a rounded end portion, which means comprises a pair of plates which are spaced in parallel with each other at a distance substantially larger than the thickness of said frame structure, a pair of retainer collars fitted laterally to said frame structure at a suitable distance from each other, three spool-shaped two-piece rubber bushings having flanges at both ends thereof, two of said rubber bushings being inserted fast into said retainer collars and one being inserted into said rounded end portion of said carried member with their flanges protruded outwardly, three pins inserted axially into said three bushings and secured at their ends into said pair of plates, and three fastener means connecting said three pins to said pair of plates at their end portions.

2. Means for supporting an automotive vehicle having a frame on a suspension member, said suspension member having a rounded-end portion, which means comprises a pair of plates spaced in parallel with each other at a distance substantially larger than the thickness of said frame structure, a pair of retainer collars fitted laterally to said frame structure at a suitable distance from each other, three spool-shaped two-piece rubber bushings having flanges at both ends thereof, two of said rubber bushings being inserted fast into said retainer collars and one being inserted into said rounded portion of said suspension means with their flanges protruded outwardly, three pins inserted axially into said three bushings and secured at their ends into said pair of plates, and three fastener means connecting said three pins to said pair of plates at their end portions.

3. Supporting means according to claim 2, in which said suspension member comprises a multileaf spring, said rounded end portion being provided at one end of said spring and in which the opposite end of said spring is connected to said frame by a pivoted link.